(12) United States Patent
Snodgrass

(10) Patent No.: US 9,695,865 B2
(45) Date of Patent: Jul. 4, 2017

(54) LOCKING MECHANISM FOR A CONTROL CABLE ADJUSTER

(71) Applicant: Schlage Lock Company LLC, Indianapolis, IN (US)

(72) Inventor: John Snodgrass, Indianapolis, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 474 days.

(21) Appl. No.: 14/204,658

(22) Filed: Mar. 11, 2014

(65) Prior Publication Data

US 2014/0251062 A1    Sep. 11, 2014

Related U.S. Application Data

(60) Provisional application No. 61/776,730, filed on Mar. 11, 2013.

(51) Int. Cl.
*F16C 1/22* (2006.01)

(52) U.S. Cl.
CPC .......... *F16C 1/226* (2013.01); *F16C 2350/52* (2013.01); *Y10T 74/2045* (2015.01)

(58) Field of Classification Search
CPC ........ F16C 1/18; F16C 1/226; F16C 2300/02; Y10T 74/2045; Y10T 74/20456
USPC ...... 74/501.5 R; 403/118; 188/24.11, 196 D; 474/80
See application file for complete search history.

(56) References Cited

U.S. PATENT DOCUMENTS 4,242,932 A  *  1/1981  Barmore ............. F16B 23/0092
411/403
4,543,849 A  *  10/1985  Yamamoto ................ B62L 3/00
188/196 D (Continued)

FOREIGN PATENT DOCUMENTS

GB          200159      *  7/1923

OTHER PUBLICATIONS

Ingersoll Rand Security Technologies, "Von Duprin Installation Instructions for 98/9949 concealed vertical device for hollow metal and aluminum doors", 2012 (12 pages).

(Continued)

*Primary Examiner* — Vinh Luong
(74) *Attorney, Agent, or Firm* — Taft Stettinius & Hollister LLP

(57) ABSTRACT

An assembly for adjusting a cable that includes a locking sleeve and an adapter that is connected to the cable. The adapter includes male and female-threaded portions that are coupled together. The locking sleeve is configured to be displaced between engagement and disengagement positions. When in the engagement position, securing devices of the male and female-threaded portions engage inner sections of the locking sleeve in a manner that prevents the male and female-threaded portions from being rotated relative to each other, thereby preventing a change in the length of the adapter so as to prevent an adjustment of the cable. When the cable is to be adjusted, the locking sleeve is displaced to disengagement position such that the securing device of either the male or female-threaded portion is disengaged from the locking sleeve, thereby allowing rotation of the male or female-threaded portions relative to each other.

17 Claims, 3 Drawing Sheets

(56) References Cited

U.S. PATENT DOCUMENTS

| | | | | |
|---|---|---|---|---|
| 5,119,689 A * | 6/1992 | Adams | ............... | F16C 1/226 |
| | | | | 403/118 |
| 5,144,856 A * | 9/1992 | Roca | ............... | F16C 1/226 |
| | | | | 74/501.5 R |
| 5,156,064 A * | 10/1992 | Truman | ............... | F16C 1/14 |
| | | | | 403/106 |
| 5,428,703 A * | 6/1995 | Lee | ............... | G02B 6/3887 |
| | | | | 385/60 |
| 6,328,138 B1 * | 12/2001 | Takizawa | ............... | B62L 3/00 |
| | | | | 188/24.11 |
| 6,405,613 B1 * | 6/2002 | Lim | ............... | B62M 25/02 |
| | | | | 474/80 |
| 8,100,032 B2 | 1/2012 | Boehm | | |
| 2010/0005921 A1 * | 1/2010 | Thomas | ............... | B60K 23/02 |
| | | | | 74/502.6 |
| 2011/0102007 A1 * | 5/2011 | Ghadaksaz | ............... | G01R 1/06772 |
| | | | | 324/755.02 |
| 2011/0280521 A1 * | 11/2011 | Kachmar | ............... | G02B 6/3821 |
| | | | | 385/78 |
| 2015/0364853 A1 * | 12/2015 | Thijssen | ............... | F21V 23/06 |
| | | | | 439/660 |

OTHER PUBLICATIONS

Canadian Office Action; Canadian Intellectual Property Office; Canadian Patent Application No. 2,860,821; Oct. 13, 2016; 3 pages.

* cited by examiner

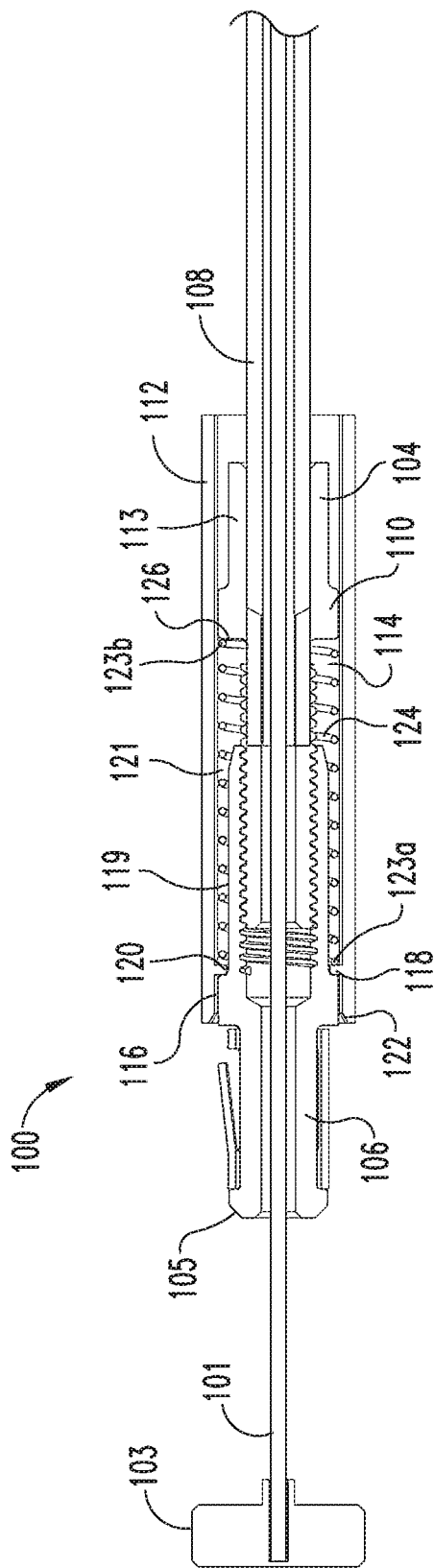
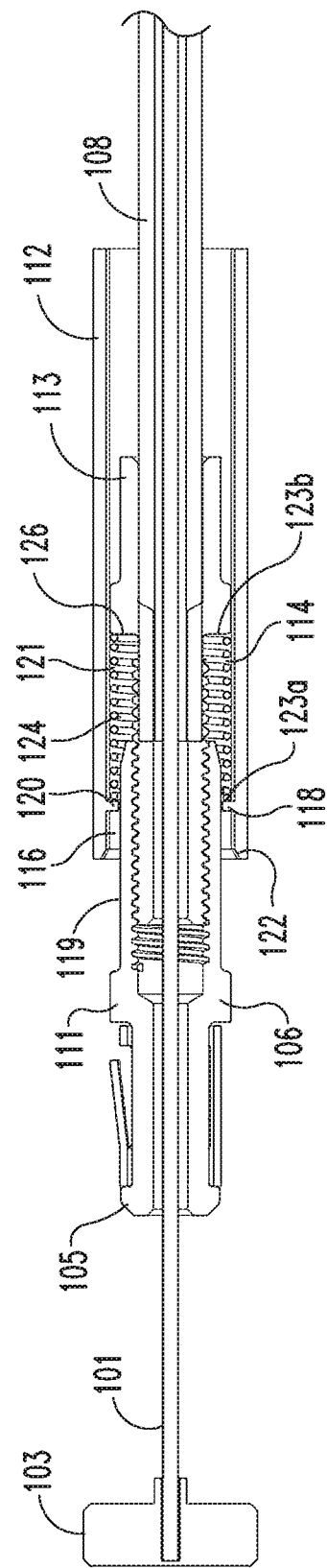

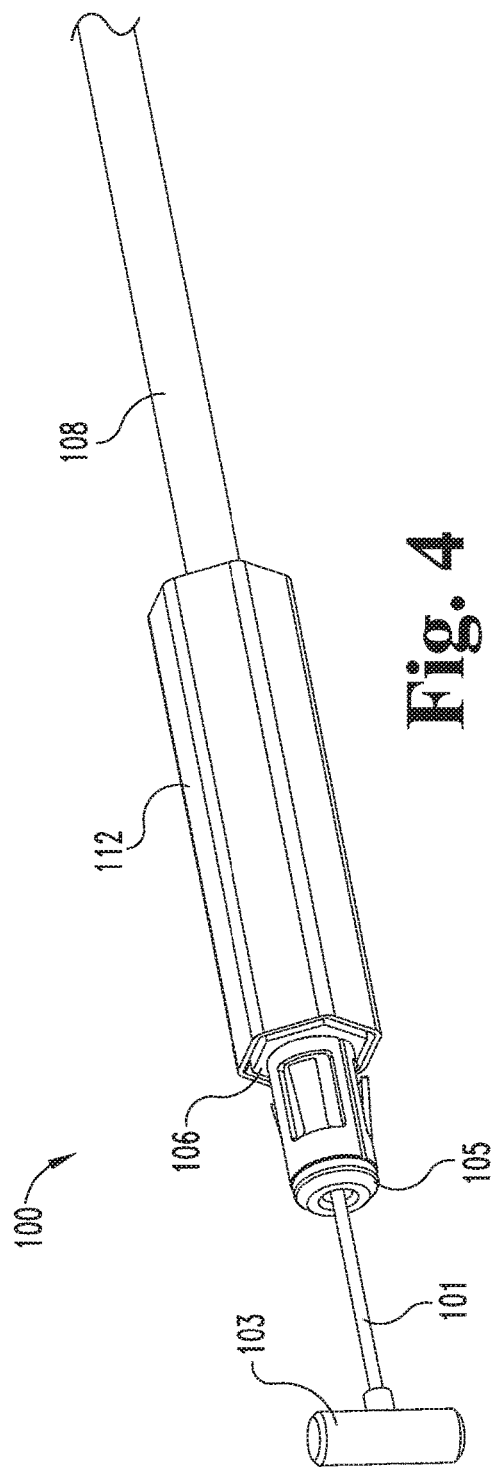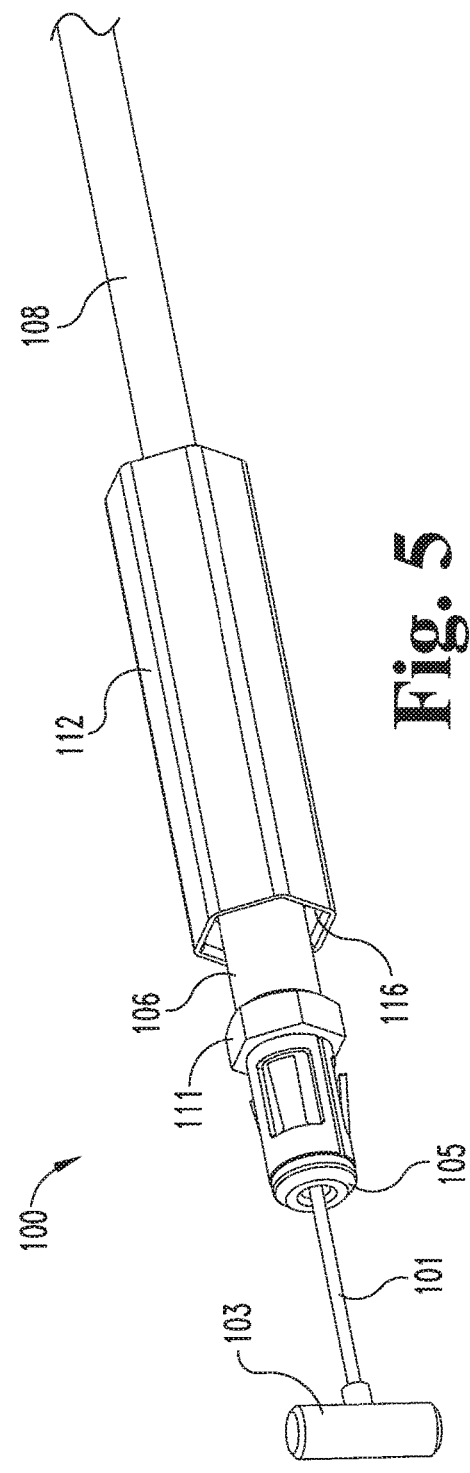

LOCKING MECHANISM FOR A CONTROL CABLE ADJUSTER

CROSS REFERENCE TO RELATED APPLICATIONS

The present application claims the benefit of U.S. Provisional Patent Application Ser. No. 61/776,730, filed Mar. 11, 2013, which is incorporated herein by reference in its entirety.

BACKGROUND

The present application generally relates to an adjuster assembly, and more particularly, to a control cable adjuster. Adjustable steel cables, such as, for example, fixed length braided steel cables, are utilized in a variety of technologies. The amount of slack, or tautness, of such cables is often adjusted through the use of cable adjusters. Moreover, cable adjusters typically adjust the length of a conduit of the cable adjuster that is positioned at an end of the cable or inline between the two ends of the cable, which changes the length of the cable that extends out an end of the cable adjuster. Often, by increasing the amount of cable that extends from an end of the cable adjuster, an operating tautness of the cable may be increased.

Cable adjusters often utilize a jam nut to at least assist in maintaining the cable adjuster at a particular length, and thus the cable at a particular tautness. Moreover, when a cable adjuster is set at a particular orientation, that orientation of the cable adjuster may be generally locked or otherwise maintained through the engagement of the cable adjuster with a jam nut, as well as by tightening other portions of the cable adjuster. Typically, wrenches are utilized to tighten/untighten the jam nut against the cable adjuster, as well as for adjusting relative positions of other portions of the cable adjuster. However, over time and/or through the use of the associated machinery, the locking force the jam nut exerts on the cable adjuster may be reduced, such as, for example, the jam nut becoming loose from the cable adjuster. For example, operation of associated machinery may produce vibrations along the cable that may be transmitted to the cable adjuster and/or jam nut. Over time, such vibrations may loosen the locking engagement of the jam nut to the cable adjuster, which may allow for changes in the length in the cable adjuster that may adversely impact the operating tautness of the associated cable.

BRIEF SUMMARY

An aspect of the present invention is an assembly for adjusting a cable. The assembly includes a male-threaded portion that is configured to receive the insertion of the cable. Further, the male-threaded portion has a first securing device that is positioned about an outer surface of the male-threaded portion. The assembly also includes a female-threaded portion that is configured for an adjustable threaded engagement with the male-threaded portion. The female-threaded portion includes a second securing device that is positioned about an outer surface of the female-threaded portion. The assembly further includes a locking sleeve that has a first inner section, a partition, and a second inner section. The first inner is surface separated from the second inner section by the partition and is configured to receive the slideable insertion of the first securing device. Additionally, the second inner section is configured to receive the slideable insertion of the second securing device. The assembly also includes a biasing member that is positioned within the locking sleeve between the partition and a flange of the male-threaded portion.

Another aspect of the present invention is an assembly that has an adjuster having a male-threaded portion that is rotatably coupled to a female-threaded portion. The male-threaded portion and the female-threaded portions include first and second securing devices, respectively. Additionally, the male-threaded portion or the female-threaded-portion is configured for operable attachment to the cable. The assembly also includes a locking sleeve having a first inner section and a second inner section. The locking sleeve is configured for displacement between an engagement position and a disengaged position relative to the adjuster. When in the engagement position, the first securing device is positioned in the first inner section, and the second securing device is positioned in the second inner section. When the locking sleeve is in the disengaged position, either the first securing device is disengaged from the first inner section or the second securing device is disengaged from the second inner section. Additionally, the locking sleeve is configured to prevent the rotation of the male-threaded portion and the female-threaded portion relative to each other when in the locking sleeve is in the engagement position, and allows rotation of the male-threaded portion and the female-threaded portion relative to each other when in the locking sleeve is in the disengaged position.

Another aspect of the present invention is an assembly for adjusting a cable. The control cable includes an adapter having a male-threaded portion and a female-threaded portion. The male-threaded portion has an external thread that engages an internal thread of the female-threaded portion to adjust a length of the adapter. Further, either the male-threaded portion or the female-threaded portion is configured for operable attachment to the cable. Additionally, the male and female-threaded portions have first and second securing devices, respectively. The control cable also includes a locking sleeve that is configured to receive the insertion of at least a portion of the adapter. The locking sleeve has a first inner section and a second inner section, and is configured for displacement between an engagement position and a disengagement position relative to the adapter. When the locking device is in the engagement position, the first securing device operably engages the first inner section and the second securing device operably engages the second inner section. Further, when in the disengaged position, either the first securing device or the second securing device is disengaged from the corresponding first or second inner section, thereby allowing the male-threaded portion and the female-threaded portion to be rotated relative to each other to adjust the length of the adapter. Additionally, the locking sleeve is configured to maintain the length of the adapter when the locking sleeve is in the engagement position.

Other aspects of the present invention will become apparent by consideration of the detailed description and accompanying drawings.

BRIEF DESCRIPTION OF THE DRAWINGS

FIG. 2 illustrates a cross-sectional view of the assembly shown in FIG. 1 with the locking sleeve in an engagement position relative to the adjuster.

FIG. 3 illustrates a cross-sectional view of the assembly shown in FIG. 1 with which the locking sleeve in a disengaged position relative to the adjuster.

FIG. 4 illustrates a perspective view of the assembly shown in FIG. 1 with the locking sleeve in an engagement position relative to the adjuster.

FIG. 5 illustrates a perspective view of the assembly shown in FIG. 1 with the locking sleeve in a disengaged position relative to the adjuster.

Figure 1:
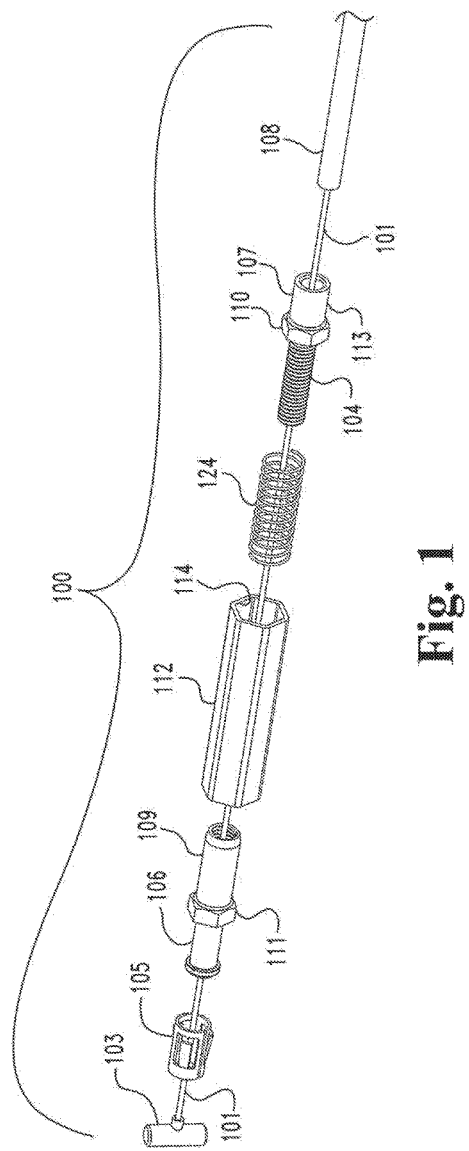
FIG. 1 illustrates an exploded view of an exemplary assembly according to an illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates an exploded view of an exemplary assembly 100, which includes a cable 101 and an adjuster 102. In the embodiment shown in FIG. 1, the assembly 100 is a control cable assembly and the adjuster 102 is a threaded control cable adjuster. The cable 101 may be a core wire such as a braided steel cable. According to certain embodiments, the assembly 100 also includes an end-fitting 103 that may be attached to one end of the cable 101. The end fitting 103 may be configured to secure the cable 101 to associated equipment or machinery. For example, the end fitting 103 may be configured for a retaining engagement with a clip, cap link, or snap link, among other attachment mechanisms. Further, although embodiments of the assembly 100 illustrated herein show the adapter 102 in relative close proximity to the end fitting 103, the adapter 102, and associated locking sleeve 112, may be positioned at a variety of locations along the cable 101, such as, for example, along a mid-section of the cable 101.

According to the illustrated embodiment, the adjuster 102 includes a male-threaded, or first, portion 104 coupled to a female-threaded, or second, portion 106. The male-threaded portion 104 and/or the female-threaded portion 106 may be at least partially hollow so as to provide a passageway for at least the cable to pass through the adjuster 102. Further, according to certain embodiments, the cable 101 is encased within a conduit 108, such as, for example, a plastic sheath or coating that is applied to, or otherwise covers, at least a portion of the outer surface of the cable 101. Additionally, the adjuster 102 may also be considered part of the conduit 108. The length of the adjuster 102 may be changed to adjust the length of cable 101 that extends beyond the end of the female-threaded portion 106.

The assembly 100 may also include a cap 105, such as, for example, a three-pronged stamped cap as seen in FIG. 1. According to certain embodiments, the cap 105 may be configured to secure at least the adjuster 102 to an adjacent machine or equipment. For example, according to certain embodiments, the cap 105 may be configured to be placed within and/or engage a mount on equipment or machinery that is utilizing the cable 101. Further, according to certain embodiments, the cap 105 may be configured for a snap fit into a recess of a mount.

The male-threaded portion 104 and the female-threaded portion 106 may be coupled to the cable 101 and/or the portion of the conduit 108 that is encasing the cable 101 in various manners. For example, according to certain embodiments, one side of the adjuster 102, either the male-threaded portion 104 or the female-threaded portion 106, is attached to the conduit 108 while the other side functions as an end-fitting. In the embodiment shown in FIG. 1, the female-threaded portion 106 is acting as the end-fitting and the male-threaded portion 104 is connected to the conduit 108. For example, as shown in FIGS. 2 and 3, according to certain embodiments, a hub portion 113 of the male-threaded portion 104 may be crimped onto a portion of the conduit 108 that encases the cable 101.

According to certain embodiments, a securing device, or first outer portion, 110 is positioned about at least a portion of the outer surface 107 of the male thread portion 104. Similarly, the female-threaded portion 106 may also include a securing device, or second outer portion, 111 positioned about at least a portion of an outer surface 109 of the female-threaded portion 106. As discussed below, the securing devices 110, 111 of the male and female-threaded portions 104, 106 are configured for a mating engagement with inner sections of a locking sleeve 112. Additionally, according to certain embodiments, the securing devices 110, 111 may have a variety of non-round shapes, including, for example, a hexagonal shape and other nut-shaped formations, among other shapes. Further, the size and shape of the securing device 110 of the male-threaded portion 104 may or may not be the same as the size and shape of the securing device 111 of the female-threaded portion 106.

FIGS. 2 and 4 illustrate the assembly 100 wherein the locking sleeve 112 is in an engagement position such that the locking sleeve 112 secures the adjuster 102 in a manner that prevents motion relative to the male-threaded portion 104 and the female-threaded portion 106. The locking sleeve 112 may be constructed form a variety of different materials, and may be transparent, translucent, or opaque. Further, the assembly 100 can be constructed from a variety of materials, as would be understood by a person skilled in the art. When the locking sleeve 112 is in the engagement position, the securing devices 110, 111 of the male and female-threaded portions 104 are engaged with inner portions of the locking sleeve 112 in a manner that prevents rotational movement of the female-threaded portion 106 relative to the male-threaded portion 104, and vice versa.

More specifically, according to certain embodiments, the locking sleeve 112 includes a first inner section 114, which corresponds to the shape of the securing device 110 of the male-threaded portion 104 of the adjuster 102. The locking sleeve 112 further includes a second inner section 116, which corresponds to the shape of the securing device 111 of the female-threaded portion 106 of the adjuster 102. For example, as shown in at least FIGS. 1, 4, and 5, the first and second inner sections 114, 116 of the locking sleeve 112 may be generally hexagonal shaped cavities that are configured to receive the insertion of similarly hexagonally-shaped securing devices 110, 111 of the male-threaded and female-threaded portions 104, 106, respectively. As discussed, such non-round mating configurations of the first and second inner sections 114, 116 of the locking sleeve 112 and the securing devices 110, 111 of the male and female-threaded portions 104, 106 may prevent the rotation of the male and female-threaded portions 104, 106 relative to each other. As a result, with the locking sleeve 112 in the engagement position, the male and female-threaded portions 104, 106 cannot be rotated relative to each other, and thus the length of the adjuster 102, and moreover the length of the conduit 108, is not adjustable, thereby allowing the length of the cable 101 that extends beyond the adjuster 102 to be maintained. Additionally, such a configuration of the locking sleeve 112 may prevent relative movement between the male-threaded portion 104 and the female-threaded portion 106 that is often associated with vibration, such as, for example, cable vibration.

The locking sleeve 112 further includes a partition 118 positioned between the first inner section 114 and the second inner section 116. Additionally, the locking sleeve 112 includes a hole 120 that may be generally in a central location of the partition 118 that is configured to allow passage of the cable 101 through the partition 118. The locking sleeve 112 may also include a chamfer 122 to facilitate the ability of the locking sleeve 112 to be seated on the adjuster 102. More specifically, the chamfer 122 may be configured to facilitate the insertion of at least a portion of the female-threaded portion 106 into the second inner section 116 of the locking sleeve 112.

The locking sleeve 112 may be as long as necessary to simultaneously engage the securing devices 110, 111 of both the male-threaded portion 104 and the female-threaded portion 106 of the adjuster 102 when the adjuster 102 is at the extreme adjustment limit, and more specifically, when opposing ends of the engaged male and female-threaded portions 104, 106 are at their furthest distance apart. Further, according to certain embodiments, the sleeve 112 may be sized so as to allow access to portion of the male-threaded portion 104 and/or female-threaded portion 106 that is to be secured to the cable 101, such as, for example, exposure to a hub portion 113 of the male-threaded portion 104 that may be crimped onto a portion of the conduit 108 that encases the cable 101, as previously discussed.

The assembly 102 further includes a biasing member 124 such as, for example, a compression spring. According to the illustrated embodiment, with locking sleeve 112 in operable engagement with the adjuster 102, the biasing member 124 may be positioned within a spring cavity 121 within the inner section 114 of the locking sleeve 112 that extends from the partition 118 to a flange 126 of the male-threaded portion 104. More specifically, a first end 123a of the biasing member 124 may be seated, or otherwise abut against, the partition 118 of the locking sleeve 112, while a second end 123b of the biasing member 124 may abut against the flange 126 of the male-threaded portion 106. The size of the spring cavity 121 may be adjusted based on adjustments to the length of the adjuster 102. Thus, the biasing member 124 is generally longer than the longest length of the spring cavity 121 when the adjuster 102 is at its longest, or extreme adjustment limit. Further, the movement of at least a portion of the biasing member 124 may be guided by an outer diameter 119 of the female-threaded portion 106.

FIGS. 3 and 5 illustrate an assembly 100 in which the locking sleeve 112 is subjected to a displacement force that is at least sufficient to overcome the biasing force of the biasing member 124 so that at least the locking sleeve 112 is displaced relative to the female-threaded portion 106 to a disengaged position. In the present example, the securing device 110 of the male-threaded portion 104 remains engaged with the inner section 114 of the locking sleeve 112.

With the locking sleeve 112 in the disengaged position, the length of the adjuster 102, and thus the length of the cable on the end fitting 103 side of the locking sleeve 112, may be adjusted. For example, with the locking sleeve 112 in the disengaged position, the female-threaded portion 106 may be rotated, by hand, while the locking sleeve 112 (and consequently the male-threaded portion 104) is held in a fixed position. The rotation of the female-threaded portion 106 relative to the male-threaded portion 104 changes the length of the adjuster 102, and thus changes the length of the cable 101 that extends beyond the female-threaded portion 106 and toward the end fitting 103. Alternatively, with the locking sleeve 112 in the disengaged position, the female-threaded portion 106 may be held in a fixed position while the locking sleeve 112 (and consequently the male-threaded portion 104) is rotated, which again may be done by hand. In such situations, the rotation of the male-threaded portion 104 relative to the female-threaded portion 106 also changes the length of the cable 101 extending beyond the female-threaded portion 106. It is contemplated that in some embodiments, with a modest amount of dexterity, adjustment of the adjuster 102 can be performed with one hand.

As one example, increasing the threaded engagement between the male-threaded portion 104 and the female-threaded portion 106 of the adjuster 102 by one-quarter of an inch (¼") reduces the length of the conduit 108 (which includes the adjuster 102) by one-quarter of an inch (¼"), and the free cable length beyond the end of the conduit 108 on the end fitting 103 side of the locking sleeve 112 is increased by one-quarter of an inch (¼"). Generally, this relationship applies to the full range of adjustment.

Once the desired adjustment has been made, the locking sleeve 112 is returned to the engagement position, such as, for example, by the biasing element 124 following removal of the displacement force that had been exerted on the locking sleeve 112. With the locking sleeve 112 in the engagement position, the locking sleeve 112 is reengaged with at least the securing device 111 of the female-threaded portion 106. If, however, the locking sleeve 112 fails to positively reseat on the adjuster 102, such as, for example, fails to be properly reseated on the securing device 111 due to being angularly misaligned, then the adjuster 102 is free to rotate, but only until angular alignment is achieved. When proper angular alignment between the locking sleeve 112 and the female-threaded portion 106 is attained, the biasing member 124 pushes the locking sleeve 112 into the fully locked, or engaged position.

In addition, according to certain embodiments, if the locking sleeve 112 is temporarily disengaged during installation, such as, for example, the locking sleeve 112 being displaced from the engagement position, the locking sleeve 112 will automatically snap back into place after allowing no more than one notch of angular misalignment. The actual magnitude of any angular displacement error that can occur when the locking sleeve 112 re-engages the adjuster 102 is dependent on the outer profile of the adjuster 102 (i.e., the securing device 111 of the female-threaded portion 106 in the embodiment shown in FIG. 1). For example, a portion of the adjuster 102 whose outer profile is a regular hexagon (a common bar stock profile) can suffer an unintended angular displacement of no more than approximately 60°.

The assembly 100 may be adjusted without using a wrench. This may allow the cable 101 to be adjusted relatively faster and/or easier. In addition, the locking action of the locking sleeve 112 may provide a visual and/or tactile indication that the adjuster 102 is locked whereas it may not be possible to visually inspect the tightness of a nut. The locking sleeve 112 generally prevents the adjuster 102 from coming loose due to an improperly tightened fastener and/or securing device.

The assembly 100 may be used to connect a push bar on a door to a latch that is located at the top or bottom of the door. When the push bar is pressed, the assembly 100 releases the latch so that the door may be opened. Other applications or uses of the assembly 100 are contemplated.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An assembly for adjusting a cable, the assembly comprising:
   a male-threaded portion configured to receive insertion of the cable, the male-threaded portion having a first outer portion positioned about a portion of an outer surface of the male-threaded portion;
   a female-threaded portion configured for adjustable threaded engagement with the male-threaded portion, the female-threaded portion having a second outer portion positioned about a portion of an outer surface of the female-threaded portion;
   a locking sleeve having a first inner section, a partition, and a second inner section, the first inner section separated from the second inner section by the partition, the first inner section being configured to receive slideable insertion, and prevent rotation, of the first outer portion of the male-threaded portion, the second inner section configured to receive slideable insertion, and prevent rotation, of the second outer portion of the female-threaded portion, at least one of the first and second inner sections positioned a distance from an end of the locking sleeve to accommodate selective displacement of the locking sleeve from an engagement position at which the locking sleeve matingly engages, and prevents relative rotation of, the first and second outer portions, to a disengaged position at which the locking sleeve matingly engages only one, and accommodates relative rotation, of the first and second outer portions; and
   a biasing member positioned within the locking sleeve between the partition and a flange of the male-threaded portion.

2. The assembly of claim 1, further comprising an end fitting secured to a distal end of the cable.

3. The assembly of claim 2, further comprising a cap that is secured to the female-threaded portion.

4. The assembly of claim 1, wherein the locking sleeve includes a hollow cavity that is configured to receive the cable.

5. The assembly of claim 1, wherein the first outer portion has a generally hexagonal shape, and wherein the first inner section comprises a first cavity having a generally hexagonal shape that generally mates with the shape of the first outer portion.

6. The assembly of claim 5, wherein the second outer portion has a generally hexagonal shape, and wherein the second inner section comprises a second cavity having a generally hexagonal shape that generally mates with the shape of the second outer portion.

7. The assembly of claim 1, wherein the male-threaded portion includes a hub portion configured to operably secure the male-threaded portion to a conduit portion of the cable.

8. An assembly for adjusting a cable, the assembly comprising:
   an adjuster having a first portion selectively rotatably coupled to a second portion, the first portion having a first outer portion positioned on an outer surface of the first portion, the second portion having a second outer portion positioned on an outer surface of the second portion;
   a locking sleeve having a first inner section and a second inner section, the first inner section structured to securely engage the first outer portion in a manner that prevents rotational of the first portion relative to the locking sleeve, the second inner section structured to securely engage the second outer portion in a manner that prevents rotational of the second portion relative to the locking sleeve, at least one of the first and second inner sections positioned at a distance from an end of the locking sleeve that accommodates selective displacement of the locking sleeve, and without rotation of the adjuster, from (1) an engagement position at which the first outer portion securely engages the first inner section and the second outer portion securely engages the second inner section to (2) a disengaged position at which either the first outer portion is disengaged from the first inner section or the second outer portion is disengaged from the second inner section while the other of the first outer portion and the second outer portion remains securely engaged with the locking sleeve;
   a biasing member positioned within the locking sleeve, the biasing member configured to bias the locking sleeve to the engaged position, and
   wherein the locking sleeve includes a partition between the first and second inner sections, the biasing member configured to exert a force on the partition and the first portion to bias the locking sleeve to the engaged position.

9. The assembly of claim 8, wherein the second portion includes an outer diameter that is configured to guide movement of the biasing member.

10. The assembly of claim 8, wherein the first outer portion has a generally hexagonal shape, and wherein the first inner section comprises a first cavity having a generally hexagonal shape that generally mates with the shape of the first outer portion.

11. The assembly of claim 10, wherein the second outer portion has a generally hexagonal shape, and wherein the second inner section comprises a second cavity having a generally hexagonal shape that generally mates with the shape of the second outer portion.

12. The assembly of claim 8, wherein the locking sleeve further includes a chamfer configured to facilitate displacement of the second outer portion into the second inner section of the locking sleeve.

13. The assembly of claim 8, wherein the locking sleeve includes a hollow cavity that is configured to receive the cable.

14. An assembly for adjusting a cable, the assembly comprising:
  an adapter having a male-threaded portion coupled to a female-threaded portion, the male-threaded portion having an external thread that engages an internal thread of the female-threaded portion to adjust a length of the adapter, at least one of the male-threaded portion or the female-threaded portion configured for operable attachment to the cable, the male-threaded portion having a first outer portion, the female-threaded portion having a second outer portion;
  a locking sleeve having a first inner section and a second inner section, the first inner section spaced a distance from the second inner section to accommodate displacement of the locking sleeve relative to, and without rotation of, the adapter from an engaged position at which the both the first outer portion securely engages the first inner section and the second outer portion securely engages the second inner section, to a disengaged position at which either the first outer portion is disengaged from the first inner section or the second outer portion is disengaged from the second inner section, the locking sleeve further configured to maintain the length of the adapter when the locking sleeve is in the engaged position;
  a biasing member positioned within the locking sleeve, the biasing member configured to bias the locking sleeve to the engaged position, and
  wherein the locking sleeve includes a partition between the first and second inner sections, the biasing member being configured to exert a force on the partition and the male-threaded portion to bias the locking sleeve to the engaged position.

15. The assembly of claim 14, wherein the female-threaded portion includes an outer diameter that is configured to guide movement of the biasing member.

16. The assembly of claim 14, wherein the first outer portion has a generally hexagonal shape, and wherein the first inner section comprises a first cavity having a generally hexagonal shape that generally mates with the shape of the first outer portion.

17. The assembly of claim 16, wherein the second outer portion has a generally hexagonal shape, and wherein the second inner section comprises a second cavity having a generally hexagonal shape that generally mates with the shape of the second outer portion.

* * * * *